United States Patent Office 2,809,971
Patented Oct. 15, 1957

2,809,971

HEAVY-METAL DERIVATIVES OF 1-HYDROXY-2-PYRIDINETHIONES AND METHOD OF PREPARING SAME

Jack Bernstein and Kathryn A. Losee, New Brunswick, N. J., assignors to Olin Mathieson Chemical Corporation, New York, N. Y., a corporation of Virginia No Drawing. Application November 22, 1955, Serial No. 548,545

8 Claims. (Cl. 260—270)

This application is a continuation-in-part of our parent application, Serial No. 358,542, filed May 29, 1953, now abandoned.

This invention relates to, and has for its object, the provision of: (A) heavy-metal salts of 1-hydroxy-2(1H)-pyridinethiones (hereinafter referred to for brevity as 1-hydroxy-2-pyridinethiones) of the general Formula I:

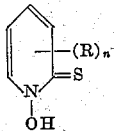

wherein R is hydrogen, lower alkyl, lower alkoxy or halogen, and n is a positive integer less than five; and (B) methods of preparing same.

The compounds of this invention can be prepared by a method which comprises interacting a 1-hydroxy-2-pyridinethione of the Formula I, preferably in the form of a soluble salt thereof (e. g. an alkali metal salt or ammonium salt thereof), with a soluble compound of the desired heavy-metal (II) in a solvent for the reactants, and recovering the reaction product. [Reactant I may be in tautomeric equilibrium with the corresponding 2-mercaptopyridine-1-oxide, i. e.

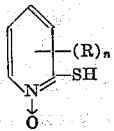

This tautomerism will not be alluded to hereinafter, it being understood that such tautomeric form (e. g., 2-mercaptopyridine-1-oxide) is included when referring to the compounds of this invention either by formula such as I, or by a name such as 1-hydroxy-2-pyridinethione.]

Examples of utilizable compounds I include the following (inter alia) and soluble salts thereof: 1-hydroxy-2-pyridinethione; 1-hydroxy-3(4,5, or 6)-methyl-2-pyridinethione; 1-hydroxy-3(4, 5, or 6)-ethyl-2-pyridinethione; 1-hydroxy-3(4, 5, or 6)-n-butyl-2-pyridinethione; 1-hydroxy-3(4, 5, or 6)-methoxy-2-pyridinethione; 1-hydroxy-3(4, 5, or 6)-ethoxy-2-pyridinethione; 1-hydroxy-3(or 5)-bromo-2-pyridinethione; 1-hydroxy-3(or 5)-chloro-2-pyridinethione; 1-hydroxy-4,6(or 3,6 or 5,6)-dimethyl-2-pyridinethione; 1-hydroxy-4,6(or 3,6 or 5,6)-diethyl-2-pyridinethione; 1-hydroxy-2(4, 5, or 6)-ethyl-6(3,4 or 5)-methyl-2-pyridinethione; 1-hydroxy-4,5(or 3,6 or 5,6)-dimethoxy-2-pyridinethione; 1-hydroxy-3,5-dibroma-2-pyridinethione; 1-hydroxy-3,5-dichloro-2-pyridinethione; 1-hydroxy-4,5,6-trimethyl-2-pyridinethione; and 1-hydroxy-3,4,5,6-tetramethyl-2-pyridinethione. The unsubstituted 1-hydroxy-2-pyridinethione and the mono-substituted 1-hydroxy-2-pyridinethione are known compounds which can be prepared as disclosed in J. A. C. S. 72, 4362 (1950). The polysubstituted 1-hydroxy-2-pyridinethiones are new compounds which can be prepared by a method comprising reacting the desired 2-amino-polysubstituted-pyridine with hydrobromic acid and bromine and reacting the product thus formed with nitrous acid to yield the corresponding 2-bromo-polysubstituted-pyridine, introducing the 1-oxide group by treatment with a peracid, such as perbenzoic or peracetic acid to form the corresponding 2-bromo-polysubstituted-pyridine-1-oxide of the Formula III:

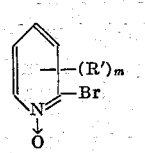

wherein R' is lower alkyl, lower alkoxy, or halogen and m is a positive integer from two through four.

To prepare the 1-hydroxy-polysubstituted-2-pyridinethiones, utilizable as starting materials in the preparation of the heavy-metal salts of this invention, the compounds of Formula III are reacted with an alkali metal sulfide, an alkali metal hydrosulfide or preferably thiourea. If thiourea is used, the reaction is optimally conducted in an organic solvent, such as alcohol, at an elevated temperature, and the resulting product is converted to its alkali metal or ammonium salt by alkalization with a base such as an alkali metal hydroxide or ammonium hydroxide or a salt of the alkali metal with a weak acid (e. g. sodium carbonate). The reaction yields an alkali metal or ammonium salt of a compound of Formula I, wherein n is 2, 3, or 4, depending on the degree of substitution of the starting pyridine reactant.

Suitable heavy-metal compound reactants (II) utilizable in the conversion of compounds of Formula I (or their alkali metal or ammonium salts) to the heavy-metal salts of this invention include salts in which the heavy-metal group is (inter alia) copper, iron, manganese, tin, mercury, cobalt, chromium, lead, gold, cadmium, nickel, silver, zinc, titanium, arsenic, antimony, and bismuth (the term heavy-metal, as employed herein, including the heavy non-metals of metallic character, such as arsenic). The reactants II may be (inter alia) nitrates, acetates, sulfates, and halides. When a semi-metal, such as arsenic, antimony, or bismuth, is used, in some instances less than the total valence of the element is used in the making of the heavy-metal salt, so that a basic salt is produced as illustrated in Example 9, hereinafter.

The following examples are illustrative of, but not limitative of, the invention:

EXAMPLE 1

*Manganese salt of 1-hydroxy-2-pyridinethione*

A solution of 0.99 g. (0.005 mole) of manganese chloride tetrahydrate in 50 cc. of water is added to a solution of 1.27 g. (0.01 mole) of 1-hydroxy-2-pyridinethione in 10 cc. of N sodium hydroxide. The product, a yellow solid, precipitates immediately, and is filtered, washed with water, alcohol and ether, and is air-dried. Weight about 1.3 g.

EXAMPLE 2

*Nickel salt of 1-hydrogen-2-pyridinethione*

A solution of 1.18 g. (0.005 mole) of nickel chloride hexahydrate in 50 cc. of water is added to a solution of 1.27 g. of 1-hydroxy-2-pyridinethione in 10 cc. of N sodium hydroxide. The product, a brown solid, precipitates immediately, and is filtered, washed with water, alcohol and ether, and is air-dried. Weight about 1.26 g.

EXAMPLE 3

*Ferric salt of 1-hydroxy-2-pyridinethione*

A solution of 1.35 g. (0.0033 M) of ferric nitrate in 50 cc. of water containing approximately 10 cc. of 10% nitric acid is added to a solution of 1.27 g. of 1-hydroxy-2-pyridinethione in 10 cc. N sodium hydroxide. The product, a blue solid, precipitates immediately, and is filtered, washed with water, alcohol and ether and air-dried. Weight about 1.33 g.

EXAMPLE 4

*Ferrous salt of 1-hydroxy-2-pyridinethione*

A solution of 0.85 g. (0.005 mole) of $FeSO_4$ (86%) in 50 cc. of water containing 15 cc. of 10% sulfuric acid is added to a solution of 1.27 g. of 1-hydroxy-2-pyridinethione in 10 cc. of normal sodium hydroxide. The product, a green solid, precipitates, and is filtered, washed with water, alcohol and ether and air-dried. Weight about 1.15 g.

EXAMPLE 5

*Mercuric salt of 1-hydroxy-2-pyridinethione*

A solution of 1.59 g. (0.005 mole) of mercuric acetate in 50 cc. of water is added to a solution of 1.27 g. of 1-hydroxy-2-pyridinethione in 10 cc. of normal sodium hydroxide. The product, a white solid, precipitates and is filtered, washed with water, alcohol and ether and air-dried. Weight about 2.13 g.

EXAMPLE 6

*Mercurous salt of 1-hydroxy-2-pyridinethione*

A solution of 2.8 g. (0.01 mole) of $HgNO_3 \cdot H_2O$ in 50 cc. of water containing approximately 15 cc. of 10% nitric acid is added to a solution of 1.27 g. of 1-hydroxy-2-pyridinethione in 10 cc. of normal sodium hydroxide. The product, a gray solid, precipitates and is filtered, washed with water, alcohol, and ether and air-dried. Weight about 2.67 g.

EXAMPLE 7

*Silver salt of 1-hydroxy-2-pyridinethione*

A solution of 1.69 g. (0.01 mole) of silver nitrate in 50 cc. of water is added to a solution of 1.27 g. of 1-hydroxy-2-pyridinethione in 10 cc. of N sodium hydroxide. The product, a white solid, forms and is filtered, washed with water, alcohol and ether and air-dried, weight 2.41 g.

EXAMPLE 8

*Auric salt of 1-hydroxy-2-pyridinethione*

A solution of 3.03 g. (0.01 mole) of gold chloride in 50 cc. of water is added to a solution of 3.81 (0.03 mole) of 1-hydroxy-2-pyridinethione in 30 cc. of N sodium hydroxide. The solid which precipitates is filtered, washed with water, alcohol and ether and air-dried.

EXAMPLE 9

*Antimonous basic salt of 1-hydroxy-2-pyridinethione*

A solution of 0.76 g. (0.0033 mole) of antimony trichloride in 50 cc. of water containing approximately 15 cc. of 20% HCl is added to a solution of 1.27 g. of 1-hydroxy-2-pyridinethione in 10 cc. of normal sodium hydroxide. The product, a white solid, precipitates immediately, and is filtered, washed with water, alcohol and ether and air-dried. Weight about 1.3 g. (It appears from analysis that two moles of 1-hydroxy-2-pyridinethione react with one mole of the antimony compound.) The product is believed to have the following formula:

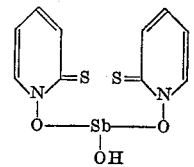

or

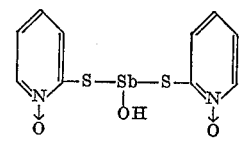

(The bismuth and arsenic derivatives are believed to have a corresponding structure.)

EXAMPLE 10

*Antimonic salt of 1-hydroxy-2-pyridinethione*

A solution of 2.99 g. (0.01 mole) of antimony pentachloride in 100 cc. of water containing approximately 50 cc. of 20% HCl is added to a solution of 6.35 g. (0.05 mole) of 1-hydroxy-2-pyridinethione in 50 cc. of normal sodium hydroxide. The solid which precipitates is filtered, washed with water, alcohol and ether and air-dried.

EXAMPLE 11

*Cobaltous salt of 1-hydroxy-2-pyridinethione*

A solution of 1.46 g. (0.005 mole) of $Co(NO_3)_2 \cdot 6H_2O$ in 50 cc. of water is added to a solution of 1.27 g. of 1-hydroxy-2-pyridinethione in 10 cc. of N sodium hydroxide. The product, a gold-colored solid, precipitates and is filtered, washed with water, alcohol and ether and air-dried. Weight about 1.35 g.

EXAMPLE 12

*Lead salt of 1-hydroxy-2-pyridinethione*

A solution of 1.66 g. (0.005 mole) of lead nitrate in 50 cc. of water is added to a solution of 1.27 g. of 1-hydroxy-2-pyridinethione in 10 cc. of N sodium hydroxide. The product, a pale yellow solid, precipitates and is filtered, washed with water, alcohol and ether and air-dried. Weight about 1.88 g.

EXAMPLE 13

*Bismuth salt of 1-hydroxy-2-pyridinethione*

A solution of 1.62 g. (0.0033 mole) of $$Bi(NO_3)_3 \cdot 5H_2O$$

in 50 cc. of water containing 15 cc. of 10% nitric acid is added to a solution of 1.27 g. of 1-hydroxy-2-pyridinethione in 10 cc. of N sodium hydroxide. The product, a light yellow solid, precipitates and is filtered, washed with water, alcohol and ether and air-dried. Weight about 1.69 g.

EXAMPLE 14

*Arsenic salt of 1-hydroxy-2-pyridinethione*

A solution of 1.81 g. (0.01 mole) of arsenic trichloride in 50 cc. of water containing approximately 20 cc. of 20% HCl is added to a solution of 3.81 g. (0.03 mole) of 1-hydroxy-2-pyridinethione in 30 cc. of N sodium hydroxide. The solid which precipitates is filtered, washed with water, alcohol and ether and air-dried.

EXAMPLE 15

*Cupric salt of 1-hydroxy-2-pyridinethione*

A solution of 1.27 g. of 1-hydroxy-2-pyridinethione in 15 cc. of alcohol is added to a solution of 1.25 g. (0.005 mole) of CuSO₄.5H₂O in 100 cc. of water. The product, a dark green precipitate, forms immediately and is filtered, washed with water, alcohol and ether. Weight about 1.3 g.

EXAMPLE 16

*Zinc salt of 1-hydroxy-2-pyridinethione*

A solution of 1.27 g. of 1-hydroxy-2-pyridinethione in 15 cc. of alcohol is added to a solution of 1.44 g. (0.005 mole) of ZnSO₄.7H₂O in 150 cc. of water. The product, a white precipitate, forms immediately and is filtered, washed with water, alcohol and ether and air-dried. It weighs about 1.3 g.

Using molar equivalents of 1-hydroxy-6-methyl-2-pyridinethione or 1-hydroxy-5-bromo-2-pyridinethione in place of 1-hydroxy-2-pyridinethione in Example 16, yields the zinc salts of the corresponding 6-methyl and 5-bromo substituted compounds.

EXAMPLE 17

*Cadmium salt of 1-hydroxy-2-pyridinethione*

A solution of 1.83 g. (0.01 mole) of cadmium chloride in 50 cc. of water is added to a solution of 2.54 g. (0.02 mole) of 1-hydroxy-2-pyridinethione in 20 cc. of normal sodium hydroxide. The solid which precipitates is filtered, washed with water, alcohol and ether and air-dried.

EXAMPLE 18

*Preparation of 1-hydroxy-3-ethyl-6-methyl-2-pyridinethione*

(a) *2-brom-3-ethyl-6-methylpyridine.*—A solution of 80 g. (0.6 mole) of 2-amino-3-ethyl-6-methylpyridine in 657 cc. of 48% hydrobromic acid is treated with 89 cc. of bromine and 100 g. of sodium nitrite according to J. Am. Chem. Soc. 71, 72 (1949). There is obtained about 80 g. (75%) product boiling at approximately 91–93° C./4 mm.

(b) *2-brom-3-ethyl-6-methylpyridine-1-oxide.* — To a solution of 50 g. (0.25 mole) of 2-brom-3-methyl-6-methylpyridine in 175 cc. acetic acid is added 80 g. 40% peracetic acid slowly at 10–15° C. After complete addition the reaction is allowed to come to room temperature and then heated at 40–45° C. for 16 hours. The acetic acid is removed under reduced pressure at 60° C. and the residue poured onto cracked ice. It is then made strongly alkaline with 50% NaOH and extracted with 2 x 400 cc. chloroform. The chloroform is dried over MgSO₄. To the dried solution is added 100 cc. of 3.8 N ethereal hydrogen chloride. The resulting solution is concentrated to 200 cc. on a water pump and after the addition of 200 cc. dry ether, a crystalline solid precipitates. This is filtered and washed with ether. The crude product weighs about 55 g. (87%) and melts at about 107–108° C. After recrystallization from alcohol-ether the product weighs about 48 g. (76%) and melts at about 110–111° C.

(c) *1-hydroxy-3-ethyl-6-methyl-2-pyridinethione.* — A solution of 12.6 g. (0.05 mole) of 2-brom-3-ethyl-6-methylpyridine-1-oxide, 3.8 g. (0.05 mole) of thiourea and 75 cc. of absolute alcohol is refluxed under nitrogen for 16 hours. The alcohol is removed and the residue poured into water and made alkaline with sodium carbonate. The mixture is allowed to stand at room temperature for one-half hour, treated with decolorizing charcoal, filtered and acidified with 10% HCl. The white solid which crystallizes out weighs about 1.2 g. and melts at approximately 40–42° C.

EXAMPLE 19

*Zinc salt of 1-hydroxy-3-ethyl-6-methyl-2-pyridinethione*

To a solution of 338 mg. (0.002 mole) of 1-hydroxy-3-ethyl-6-methyl-2-pyridinethione in 10 cc. of alcohol there is added a solution of 288 g. (0.001 mole) of ZnSO₄.7H₂O in 50 cc. of water. A gummy precipitant forms which granulates readily on gentle warming and trituration. The solid is filtered and washed with water, alcohol and ether. Weight about 250 mg.; M. P. about 147–148° C. (dec.).

EXAMPLE 20

*Ferric salt of 1-hydroxy-3-ethyl-6-methyl-2-pyridinethione*

A solution of 507 mg. (0.003 mole) of 1-hydroxy-3-ethyl-6-methyl-2-pyridinethione in 10 cc. of alcohol is added to a solution of 404 mg. (0.001 mole) of

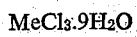

MeCl₃.9H₂O in 50 cc. of water plus 10 cc. of 10% nitric acid. A black precipitate forms which is filtered and washed with water, alcohol and ether. Weight about 300 mg.; M. P. approximately 135–140° C. (dec.).

In a similar manner, by substituting an equivalent amount of 1-hydroxy-3-ethyl-6-methyl-2-pyridinethione for the 1-hydroxy-2-pyridinethione in Examples 1, 2, 4 through 15, and 17, the corresponding manganese, nickel, ferrous, mercuric, mercurous, silver, auric, antimonous, antimonic, cobaltous, lead, bismuth, arsenic, cupric, and cadmium salts are produced, respectively.

EXAMPLE 21

*Preparation of 1-hydroxy-4,6-dimethyl-2-pyridinethione*

(a) *2-bromo-4,6-dimethylpyridine.*—To a solution of 91.5 g. of 2-amino-4,6-dimethylpyridine in 850 cc. of 48% HBr is added dropwise 115 cc. of bromine at 0 to 5° C. with vigorous stirring. A thick orange solid forms. After completion of the addition of bromine, the reaction mixture is treated with a solution of 130 g. of sodium nitrite in 200 cc. of water at 0° C. The reaction is then allowed to come to room temperature, made strongly alkaline by the addition of approximately one liter of 50% NaOH at 10–15° C. and decolorized by the addition of 100 g. of sodium sulfite in 500 cc. H₂O. The reaction mixture is steam distilled and the distillate extracted with 3×500 cc. ether. The ether is dried over MgSO₄ and removed. The residue is fractionated to yield about 64 g. of product, boiling at about 92–94° C./7 mm.

(b) *2-bromo-4,6-dimethylpyridine 1-oxide hydrochloride.*—64 g. 2-bromo-4,6-dimethylpyridine is dissolved in 200 cc. of acetic acid and 100 g. of 40% peracetic acid is added keeping the temperature below 15° C. After complete addition, the reaction is allowed to come to room temperature and then heated at 45° C. for 12 hours. The acetic acid is removed under reduced pressure and the residue poured onto cracked ice and made strongly alkaline with 40% KOH. The oil which precipitates is extracted with 3×200 cc. chloroform. The chloroform is dried over MgSO₄ and then dry HCl gas added until acid to Congo. This solution is concentrated to 250 cc. under reduced pressure to yield about 62 g. product, which melts at about 157–158° C. (dec.). After recrystallization from absolute alcohol, the product melts at about 157–158° C. (dec.).

(c) *1-hydroxy-4,6-dimethyl-2-pyridinethione.*—A solution of 2.38 g. of 2-bromo-4,6-dimethylpyridine 1-oxide HCl in 20 cc. of absolute alcohol is added to a solution of 0.76 g. of thiourea in 20 cc. of absolute alcohol. The solution is refluxed for 15 minutes and then concentrated under reduced pressure. The resulting oil is dissolved in 100 cc. of water and solid Na₂CO₃ added until the solution is alkaline. After standing 15 minutes, the solution is filtered and acidified with 10% HCl. The crystalline solid is filtered and melts at 105–107° C. After recrystallization from 25 cc. aqueous alcohol, the compound melts at about 108–109° C.

EXAMPLE 22

*Zinc salt of 1-hydroxy-4,6-dimethyl-2-pyridinethione*

To a solution of 1.55 g. (0.01 mole) of 1-hydroxy-4,6-dimethyl-2-pyridinethione in 75 cc. of hot alcohol is added a solution of 1.44 g. (0.005 mole) of $ZnSO_4 \cdot 7H_2O$ in 250 cc. of water. A white solid precipitates immediately. This is filtered, washed with water, alcohol and ether. Weight about 1.2 g.; M. P. about 218–222° C. (dec.).

EXAMPLE 23

*Ferric salt of 1-hydroxy-4,6-dimethyl-2-pyridinethione*

To a solution of 1.55 g. (0.01 mole) of 1-hydroxy-4,6-dimethyl-2-pyridinethione in 75 cc. of acetone is added a solution of 1.38 g. (0.003 mole) of $Fe(NO_3)_3 \cdot 9H_2O$ in 150 cc. of water plus 5 cc. of 10% nitric acid. A black precipitate forms immediately. This is filtered, washed with water, alcohol and ether. Weight about 950 mg.; M. P. about 200° C. (dec.).

In a similar manner, by substituting an equivalent amount of 1-hydroxy-4,6-dimethyl-2-pyridinethione for the 1-hydroxy-2-pyridinethione in Examples 1, 2, 4 through 15, and 17, the corresponding manganese, nickel, ferrous, mercuric, mercurous, silver, auric, antimonous, antimonic, cobaltous lead, bismuth, arsenic, cupric, and cadmium salts of 1-hydroxy-4,6-dimethyl-2-pyridinethione are produced, respectively.

tra tabulated in Tables I and II, wherein the effectiveness of heavy-metal salts of compounds of the formula:

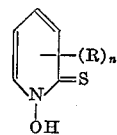

were determined.

TABLE I.—ANTIBACTERIAL ACTIVITY

| Compound | | Minimum Inhibiting Concentration (MIC) in micrograms per ml. ($\mu$g./ml.) | | |
|---|---|---|---|---|
| Salt | R | Staph. 209P | K. Pneum. | BCG |
| Cupric | Hydrogen | | | 0.06 |
| Zinc | do | 0.6 | 1 | 0.02 |
| Manganese | do | 0.15 | 2.5 | 0.015 |
| Ferrous | do | 0.25 | 30 | 0.015 |
| Ferric | do | 0.12 | 30 | 0.01 |
| Mercuric | do | 0.08 | 0.6 | 0.012 |
| Silver | do | 0.08 | 1.5 | 0.01 |
| Antimonous | do | 0.12 | 2 | 0.007 |
| Cobaltous | do | 0.12 | 12 | 0.026 |
| Lead | do | 0.12 | 7 | 0.06 |
| Bismuth | do | 0.15 | 1.5 | 0.01 |
| Ferric | 3-Ethyl-6-methyl | 15 | 30 | 0.03 |
| Zinc | do | 15 | 15 | 0.06 |
| Ferric | 4,6-Dimethyl | 2 | 60 | 0.03 |
| Zinc | do | 1 | 60 | 0.6 |

TABLE II.—ANTIFUNGAL ACTIVITY

| Compound | | MIC ($\mu$g/ml.) Microorganism | | | | | | | | | | | | | | |
|---|---|---|---|---|---|---|---|---|---|---|---|---|---|---|---|---|
| Salt | R | Aspergillus fumigatus | Aspergillus niger | Microsporum canis | Epidermophyton floccosum | Candida albicans | Microsporum audouini | Rhodotorula glutinis | Saccharomyces cerevisiae | Trichophyton mentagrophytes | Fusarium bulbigenum | Ceratostomella ulmi | Penicillium notatum | Colletotrichum phomoides | Monilinia fructicola | Botrytis cinerea |
| Control | (8-hydroxyquinoline) | 12.5 | 3.1 | | | 50 | 3.1 | 3.1 | 1.6 | 3.1 | 50 | 3.1 | 12.5 | | | |
| Cupric | Hydrogen | 3 | 25 | | | 100+ | 3 | 6 | 3 | 3 | 25 | 3 | 3 | 0.10 | 0.10 | 0.10 |
| Zinc | do | 3 | 6 | | | 3 | 3 | 3 | 3 | 3 | 3 | 3 | 3 | 3.1 | 0.8 | 0.8 |
| Manganese | do | 1.6 | 1.6 | 3.1 | 0.8 | 3.1 | 0.8 | 1.6 | 0.8 | 0.8 | 3.1 | 0.8 | 1.6 | 0.4 | 0.8 | 1.6 |
| Ferrous | do | 3.1 | 13 | 13 | 6.3 | 13+ | 1.6 | 13+ | 3.1 | 3.1 | 13+ | 1.6 | 13 | 0.6 | 1.6 | 1.6 |
| Ferric | do | 1.5 | 3.1 | 6.3 | 1.5 | 13 | 13 | 13+ | 6.3 | 1.5 | 13 | 0.8 | 6.3 | 0.6 | 0.8 | 1.6 |
| Mercuric | do | 1.6 | 3.1 | 1.6 | 1.6 | 6.3 | 0.8 | 6.3 | 3.1 | 1.6 | 3.1 | 0.8 | 3.1 | | | |
| Silver | do | 0.8 | 1.6 | 3.1 | 1.6 | 6.3 | 0.8 | 1.6 | 1.6 | 0.8 | 3.1 | 0.8 | 1.6 | | | |
| Antimonous | do | 0.8 | 0.8 | 1.6 | 0.8 | 13 | 0.8 | 1.6 | 6.3 | 0.8 | 1.6 | 0.8 | 0.8 | | | |
| Cobaltous | do | 1.6 | 3.1 | 3.1 | 0.8 | 13+ | 1.6 | 3.1 | 1.6 | 0.8 | 3.1 | 0.8 | 3.1 | | | |
| Lead | do | 3.1 | 3.1 | 6.3 | 3.1 | 13+ | 1.6 | 3.1 | 13 | 1.6 | 6.3 | 0.8 | 3.1 | | | |
| Bismuth | do | 0.8 | 1.6 | 3.1 | 0.8 | 13+ | 0.8 | 1.6 | 13 | 0.8 | 6.3 | 0.8 | 1.6 | | | |
| Ferric | 3-Ethyl-6-methyl | 50 | | | | 50 | 12.5 | | 50 | 50 | 100 | 50 | 50 | | | |
| Zinc | do | 100+ | | | | 100+ | 6.2 | | 100+ | 100+ | 100+ | 100+ | 100+ | | | |
| Ferric | 4,6-Dimethyl | 100+ | | | | 100+ | 25 | | | 3 | 100+ | 6.5 | 100+ | | | |
| Zinc | do | 100+ | | | | 100 | 12.5 | | | 6.25 | 100+ | 3.1 | 50 | | | |

Examples 18 through 23 are merely illustrative of the heavy-metal salts of 1-hydroxy-di(lower alkyl)-2-pyridinethiones within the purview of this invention; and other di(lower alkyl)-2-aminopyridines can of course be substituted for the 2-amino-3-ethyl-6-methylpyridine and 2-amino-4,6-dimethylpyridine starting materials specifically disclosed.

The heavy-metal salts of this invention are active bactericides and fungicides as evidenced by the in vitro spec- Additional in vitro tests show that the heavy-metal salts are highly effective in the control of fungi associated with the destruction of cotton fabrics, some of these salts being far more effective than is the copper salt of 8-hydroxyquinoline, a standard agent for the purpose. The results of these tests are tabulated in Table III, wherein $ID_{50}$ means the inhibitory dose in parts per million (p. p. m.) for half of the specific fungus and $ID_{100}$ is the dose for complete inhibition.

TABLE III

| Salt of 1-hydroxy-2-pyridinethione | Aspergillus niger | | Aspergillus terreus | | Chaetonium globosum | | Myrothecium verrucaria | |
|---|---|---|---|---|---|---|---|---|
| | $ID_{50}$ | $ID_{100}$ | $ID_{50}$ | $ID_{100}$ | $ID_{50}$ | $ID_{100}$ | $ID_{50}$ | $ID_{100}$ |
| Cupric | 100 | 100 | | 1 | | 1 | | 1 |
| Zinc | 1.5 | 10 | 1.1 | 3.3 | 0.6 | 2.5 | | 1 |
| Manganese | 1.0 | 3.3 | 1.1 | 10 | | 1 | | 1 |
| Ferrous | 1.5 | 10 | 0.3 | 3.3 | | 1 | | 1 |
| Ferric | 1.5 | 10 | 1.2 | 10 | | 1 | | 1 |
| Silver | 1.2 | 3.3 | 1.0 | 3.3 | | 1 | 0.6 | 2.5 |
| Antimony | 1 | 3.3 | 0.8 | 3.3 | | 1 | | 1 |
| Cobalt | 1.6 | 10 | 1.2 | 10 | | 1 | | 1 |
| Lead | 2 | 10 | 1.3 | 3.3 | | 1 | 0.6 | 2.5 |
| Bismuth | 3.7 | 10 | 1.2 | 3.3 | | 1 | 1.6 | 5 |

The salts of this invention can, therefore, be used as preservatives (for example, in leather, paper and paints), and especially in plastics and fabrics to render them proof against mildew or other fungus attack. In the protection of fabrics, for example, with the salts of this invention, the salt may be applied to and/or incorporated in the fabric in a number of ways. For example, the fabric may be impregnated with the salt or one of the moieties thereof (as explained hereinafter) as by soaking or spraying. Thus, the fabric may be impregnated with 1-hydroxy-2-pyridinethione (Formula I) or soluble salt thereof (e. g. an alkali metal salt) by soaking it in a solution thereof; and the impregnated fabric is then treated with a solution of a soluble compound of the desired heavy-metal. The reverse of this procedure can also be used. Preferably, however, the fabric is first treated with an aqueous solution of an alkali metal salt of a compound of Formula I, and then with a substantially water-soluble heavy-metal salt.

Along the same lines, the salts of this invention can also be used as protective agents for cords and ropes to prevent loss of tensile strength due to the action of cellulytic fungi. For this purpose, the desired salt may be sprayed on the cord as an aqueous suspension, or the cord bathed in an aqueous suspension of the given salt. To show this use of the salts, a test was conducted wherein 4-thread cord was bathed in the salt indicated in Table IV at the designated concentration, and the percentage loss (or gain +) of tensile strength in pounds after fourteen-day exposure to the cellulytic fungi *Chaetonium globosum* and *Myrothecium verrucaria* compared to that of cord treated with the chemical but not exposed to the fungi is reported:

TABLE IV

| Salt of 1-hydroxy-2-pyridinethione | Concentration in bath solution (mg./liter) | | | | |
|---|---|---|---|---|---|
| | 4,000 | 2,000 | 1,000 | 500 | 250 |
| Copper salt of 8-hydroxyquinoline | 36 | 35 | 73 | | |
| Zinc | | | 13 | 92 | 99 |
| Manganese | | | 10 | 21 | 19 |
| Ferrous | | | +5 | 14 | 25 |
| Ferric | | | 6 | 30 | 33 |
| Mercuric | | | +3 | 4 | +2 |
| Silver | | | 11 | 45 | 44 |
| Antimony | | | 6 | +7 | 1 |
| Cobalt | | | 7 | 4 | 6 |
| Lead | | | 18 | 16 | 6 |
| Bismuth | | | 17 | 41 | 26 |

From the above table it can be seen that many of the heavy-metal salts of the 1-hydroxy-2-pyridinethione series are superior to the standard agent, the copper salt of 8-hydroxyquinoline in protecting cord from attack by cellulytic fungi.

One of the most important uses for the salts of this invention is as plant protective agents, for which purpose they can be used either as foliage fungicides and bactericides, or as soil fungicides. When used as foliage fungicides, the salts are most advantageously sprayed on the plants to be treated. A suitable spray can be prepared by wet ball-milling the desired salt with water and preferably a wetting agent such as a polyoxyalkylene sorbitan higher fatty acid (e. g. Tween 20, a polyoxyethylene sorbitan monolaurate). To demonstrate this use of the salts of this invention, the effective concentration in parts per million ($ED_{95}$) of the salts listed in Table V which prevented 95 percent of the disease symptoms of treated cucumbers and tomatoes was determined. For this test, cucumber and tomato plants were sprayed with an aqueous suspension of the salt and a wetting agent (Tween 20), and the thus-treated plants were then sprayed with a spore suspension of *Colletotrichum lagenarium* in the case of the cucumbers to initiate folian anthracnose, and with *Alternaria solani* in the case of tomatoes to initiate early blight.

The results are summarized in Table V, which also indicates that the salts have no phytotoxicity.

TABLE V

| Salt of 1-hydroxy-2-pyridinethione | Cucumber Anthracnose | | Tomato Early Blight | |
|---|---|---|---|---|
| | $ED_{95}$ | Phytotoxicity | $ED_{95}$ | Phytotoxicity |
| Cupric | 5 | No injury | 250 | No injury. |
| Zinc | 8 | do | 125 | Do. |
| Manganese | 14 | do | 225 | Do. |
| Ferric | 16 | do | 250 | Do. |
| Cobalt | 5 | do | | (82% control.) |

When used as soil fungicides, the salts may be added directly to the soil by sprinkling the chemical itself or a mixture of the chemical and suitable diluents on the surface of the soil and then thoroughly mixing the soil and chemical. To demonstrate this use of the salts of this invention, sterile soil was infested with week old potato dextrose agar plate cultures of *Rhizoctonia solani* and allowed to incubate in greenhouse flats for four or five days. Gallon aliquots of the infested soil and of sterile non-infested soil were treated with a test chemical. The soil was treated by spreading the gallon lots in a thin layer, sprinkling the chemical over the surface, and thoroughly mixing the soil and chemical. Each gallon of treated soil was divided in half, and twenty seeds were planted in each half gallon of both infested and non-infested soil. The infested series served to measure disease control and the non-infested series served to measure phytotoxicity. The containers were watered as needed and observed daily for recording post emergence damping off. Three weeks after treating and seeding final stand counts were made and pre- and post-emergence damping-off were calculated. Under these conditions, the cupric salt of 1-hydroxy-2-pyridinethione in a concentration of 0.24 g. of salt per gallon of soil was found to protect 95% of cucumber seeds with no injury to the plants and to protect 77% of cotton seeds with no injury to the plants. Furthermore, the zinc salt of 1-hydroxy-2-pyridinethione at a concentration of 0.12 g./gal. soil was found to protect 60% of cucumber seed with only very slight stunting and the manganese salt of 1-hydroxy-2-pyridinethione at the same concentration was found to protect 50% of cucumber seeds with only very slight stunting.

To determine the effectiveness of the salts against *Pythium ultimum* incited disease in peas, the experiment was repeated except that the soil was infested with wheat culture of *P. ultimum* rather than *R. solani* and seeds of garden pea were used. Under these conditions, the following salts of 1-hydroxy-2-pyridinethione at a concentration of 0.24 gram of salt per gallon of soil protected the given percent of peas and in all instances there was no injury to the plants: cupric salt, 65%; zinc salt, 50%; manganese salt, 78%; and cobalt salt, 62%.

The salts of this invention find further use as agricultural nematocides and thus when mixed with soil aid in the protection of plants from nematode damage such as rotting of the attacked parts and adjacent tissue of the plants and the development of galls and other abnormal growth.

The invention may be otherwise variously embodied within the scope of the appended claims.

We claim:
1. Heavy-metal salts of 1-hydroxy-2-pyridinethiones of the general formula

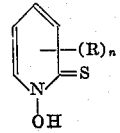

wherein R is a member of the class consisting of hydrogen, lower alkyl, lower alkoxy, and halogen, and $n$ is a positive integer less than five.

2. Heavy-metal salts of 1-hydroxy-2-pyridinethione.
3. Heavy-metal salts of 1-hydroxy-di(lower alkyl)-2-pyridinethione.
4. Zinc salt of 1-hydroxy-2-pyridinethione.
5. Manganese salt of 1-hydroxy-2-pyridinethione.
6. Ferric salt of 1-hydroxy-2-pyridinethione.
7. Cobaltous salt of 1-hydroxy-2-pyridinethione.
8. Cupric salt of 1-hydroxy-2-pyridinethione.

References Cited in the file of this patent
UNITED STATES PATENTS

| | | |
|---|---|---|
| 2,429,096 | Ladd | Oct. 14, 1947 |
| 2,686,786 | Shaw et al. | Aug. 17, 1954 |